Patented Sept. 27, 1927.

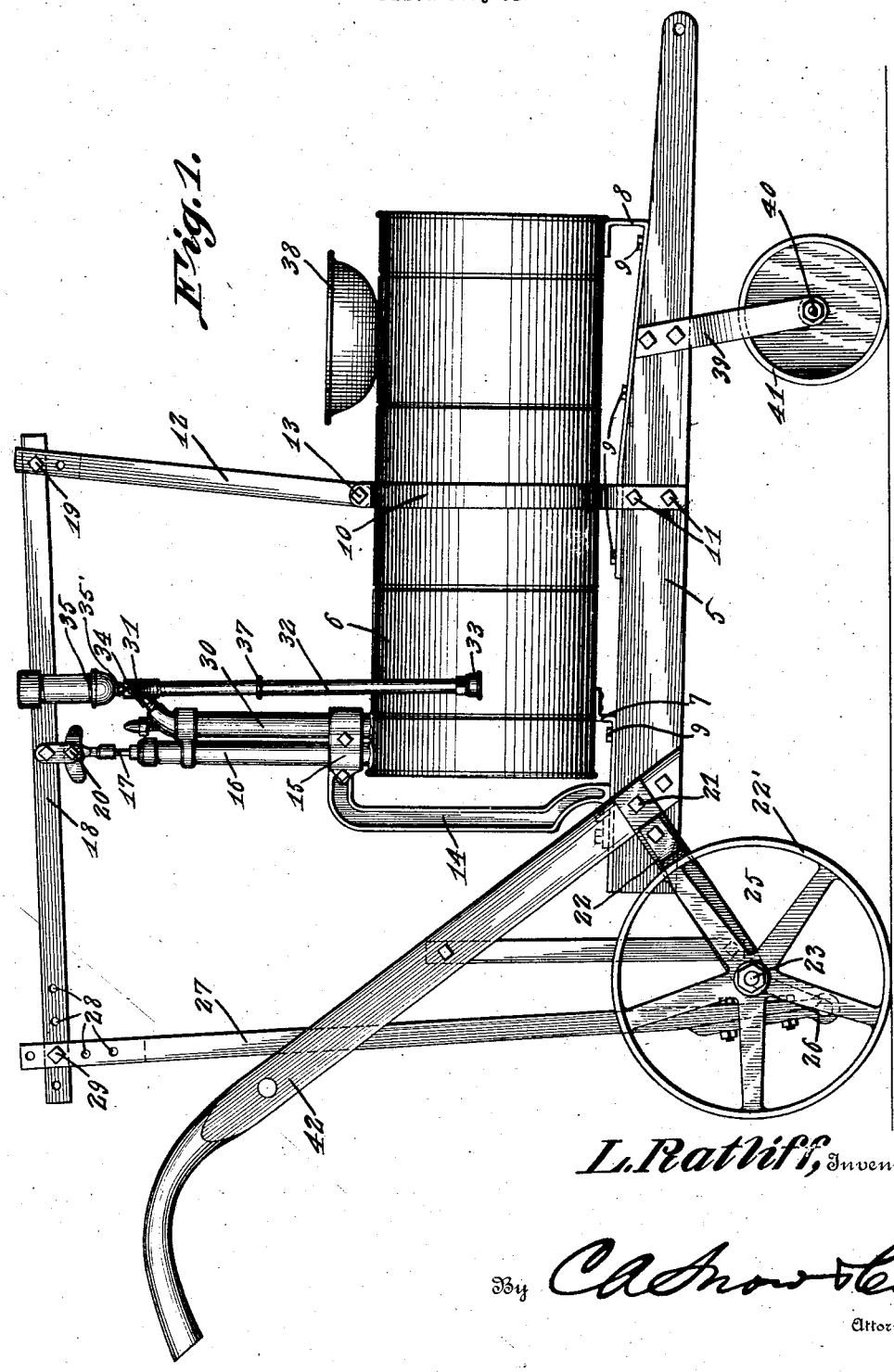

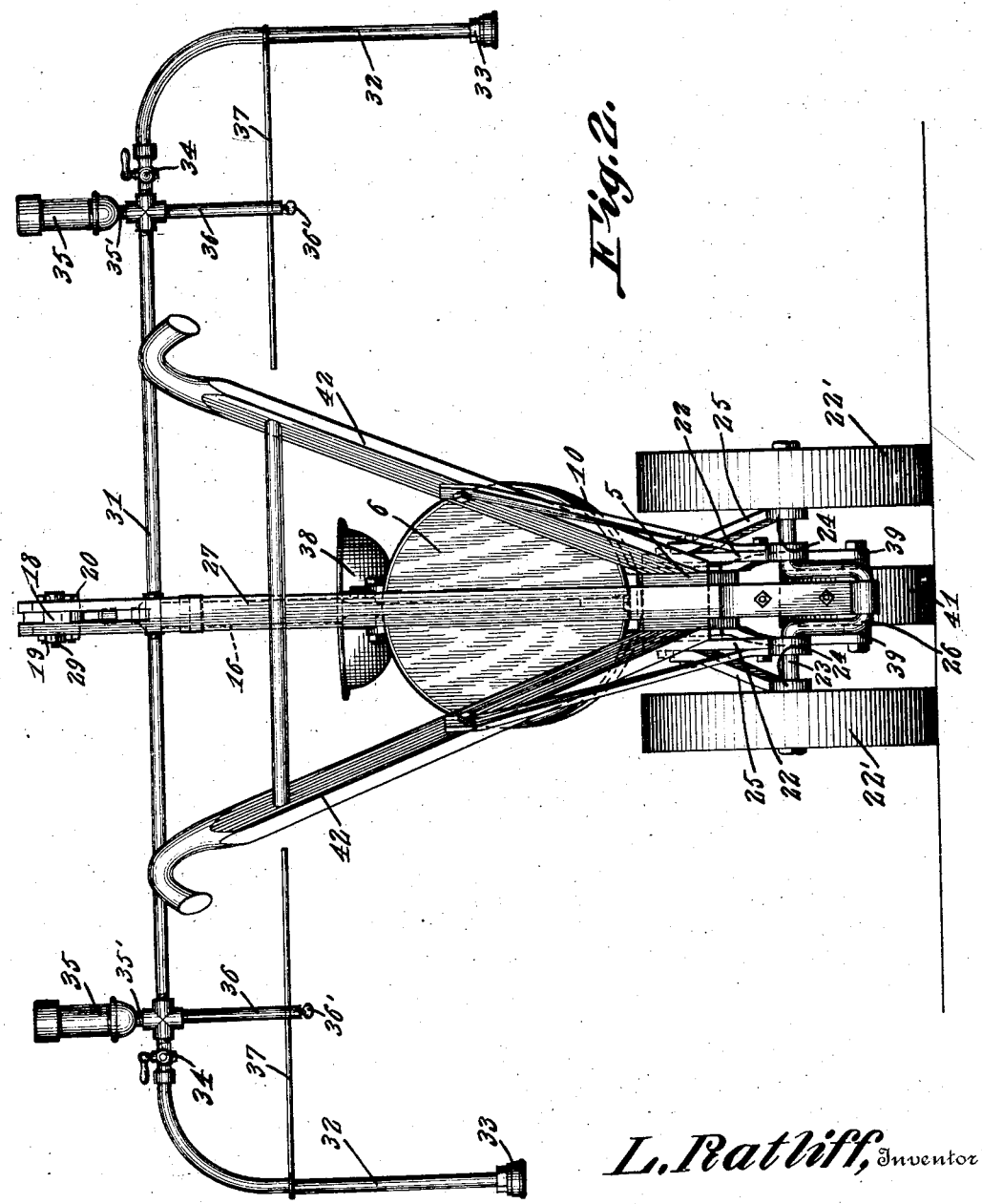

1,643,518

UNITED STATES PATENT OFFICE.

LESTER RATLIFF, OF MORVEN, NORTH CAROLINA.

LIQUID-SPRAYING MACHINE.

Application filed July 31, 1924. Serial No. 729,373.

This invention relates to a spraying device and aims to provide a novel form of spraying device for spraying and distributing an insect exterminating solution, the construction of the device being such as to be especially adapted for spraying rows of vegetation such as cotton, tobacco, potatoes or the like.

An important object of the invention is to provide a device of this character wherein the distributing nozzle may be adjusted laterally adapting the device for use in spraying plants arranged various distances apart.

Another object of the invention is to provide means for trapping a portion of the air employed for forcing the solution from the tank in which the solution is contained, to insure a steady continuous flow of the solution when the valves are opened.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a machine constructed in accordance with the invention.

Figure 2 is a rear elevational view thereof.

Referring to the drawings in detail, the machine includes a frame indicated generally by the reference character 5 on which the tank 6 is mounted and which is designed to contain the insect exterminating fluid.

Brackets 7 and 8 respectively, are mounted on the frame and are secured thereto by means of bolts 9 so that the tank will be supported in proper spaced relation with the frame 5 at all times.

Securing bands 10 have their lower ends secured to the frame 5 at 11, the upper ends thereof being held in spaced relation with each other by means of the vertical bar 12 which has its lower end positioned between the upper ends of the bands 10 and secured in such position by means of the bolt 13.

Mounted at the rear of the frame 5 is an upwardly extended arm 14 to the upper end of which is secured the collars 15 that embrace the pump cylinder 16 in which operates the piston rod 17 carrying a piston at its lower end.

The reference character 18 indicates the pump beam which has its forward end pivotally connected to the bar 12 at 19, while the central portion of the beam 18 has pivotal connection with the piston rod 17 at 20 so that upon movement of the beam 18 the piston rod 17 will be moved in its cylinder to compress air in the tank 6 to force the fluid contained therein from the tank in a fine spray.

Connected to the frame 5 at 21 are the angularly disposed arms 22 that have their rear ends provided with openings defining bearings for the axle 23 which is also shown as extending through openings formed in the heads 24 of the arms 25 that act as braces for the arms 22. Wheels 22' are mounted on the axle to move therewith.

The shaft 23 is provided with an offset portion 26 providing a crank to which the lower end of the operating arm 27 has connection, the upper end of the arm being bifurcated to accommodate the rear end of the beam 18, and as shown, the arm 27 and the beam 18 are provided with spaced openings 28 to receive the bolts 29 so that the beam will have adjustable connection with the arm 27 and permit the beam to move various distances to adjust the stroke of the pump.

Extending into the tank 6 is a discharge pipe indicated at 30 through which material passes to the horizontal pipe 31 mounted at the upper end thereof and which is shown as having its ends extending appreciable distances beyond the sides of the frame 5, where they support the flexible tubular members 32, that carry nozzles 33 at the free ends thereof. Valve members 34 are provided in the pipe 31 and control the passage of liquid to the flexible members 32. Communicating with the pipe 31 are tanks 35 through which the liquid passes in passing to the pipes 32, insuring a pressure at all times.

As clearly shown by Figure 2 of the drawings, pipes 35' provide communication between the pipe 31 and tanks 35. Pipes 36 are supported by pipe 31 and are provided with openings to receive the rods 37 that have eyes to accommodate the flexible members 32, thereby permitting the flexible members 32 and nozzles carried at the free ends thereof to be adjusted laterally to adapt the device for use in spraying rows of plants wherein the plants are positioned at various distances apart. Set screws 36' operate in the ends of the pipes 36 and engage rods 37 to hold the rods 37 in their positions of adjustment.

In order that the tank may be filled, a permanent funnel 38 is secured to the tank at the filling opening thereof. The forward portion of the frame is supported by means of the bars 39 that support the axle 40 on which the wheel 41 moves. The machine is guided by means of the handles 42 that extend rearwardly from the frame as clearly shown by Figure 1 of the drawings.

In the use of the machine, the tank 6 is filled with a suitable insect exterminating liquid and the device moved along the ground surface between the rows of plants to be sprayed. The pump is now operated to force air into the tank. When the necessary air pressure is obtained in the tank, the valves 34 are opened allowing the liquid to be forced through the flexible members and nozzles to the end that the nozzles which move directly over the plants to be sprayed break up the liquid and discharge the same in a fine spray on the plants.

Due to this construction it will be obvious that when the machine is stopped, certain quantities of air will be trapped in the auxiliary tanks 35 so that as soon as the valves 34 are opened, the liquid will be discharged and it will not be necessary to move the machine along between the rows before the liquid may be sprayed from the nozzles.

I claim:—

In a device of the character described, a wheel supported frame, a tank on the frame, a pump for forcing air into the tank, a transversely disposed pipe mounted above the tank, pipes depending from the first mentioned pipe and having openings, flexible pipes communicating with the transversely disposed pipe, rods having eyes through which the flexible pipes extend, said rods adapted to move through the openings of the second mentioned pipes, means for holding the rods in the openings, and said rods adapted to be moved to adjust the flexible pipes laterally.

In testimony that I claim the foregoing as my own, I have hereto affixed my signature.

LESTER RATLIFF.